United States Patent [19]
Ooba et al.

[11] Patent Number: 6,084,050
[45] Date of Patent: Jul. 4, 2000

[54] THERMO-OPTIC DEVICES

[75] Inventors: Naoki Ooba, Mito; Toshio Watanabe, Yokosuka; Takashi Kurihara; Saburo Imamura, both of Mito; Shoichi Hayashida, Hitachinaka; Toshiaki Tamamura, Atsugi; Tetsuyoshi Ishii, Isehara; Yasuyuki Inoue, Mito; Seiji Toyoda, Hitachinaka, all of Japan

[73] Assignee: Nippon Telegraph and Telephone Corporation, Tokyo, Japan

[21] Appl. No.: 09/004,079

[22] Filed: Jan. 7, 1998

[30] Foreign Application Priority Data

| Jan. 9, 1997 | [JP] | Japan | 9-013249 |
| Mar. 17, 1997 | [JP] | Japan | 9-082375 |
| Jun. 4, 1997 | [JP] | Japan | 9-146572 |

[51] Int. Cl.[7] ................ C08G 77/24; C08G 77/18; G02B 6/10
[52] U.S. Cl. ............... 528/42; 528/43; 385/143; 385/145; 359/288; 359/139
[58] Field of Search ............ 528/43, 42; 359/288, 359/139; 385/143, 145

[56] References Cited

U.S. PATENT DOCUMENTS 5,672,672  9/1997  Amano et al. ............ 528/16

FOREIGN PATENT DOCUMENTS

| 642 052 A1 | 3/1995 | European Pat. Off. |
| 62-119517 | 11/1985 | Japan . |
| 3-43423 | 2/1991 | Japan . |
| 4-328504 | 11/1992 | Japan . |
| 6-59293 | 11/1992 | Japan . |
| 7-84226 | 3/1995 | Japan . |

OTHER PUBLICATIONS

Akzo Nobel Electronic Products (Netherlands and Sunnyvale, CA), Packaged Polymeric 1×8 Digital Optical Switches, Proc. 21st Eur. Conf. on Opt. Comm., 1995.

Keil N. et al., Rearrangeable Nonblocking Polymer Waveguide Thermo–Optic 4×4 Switching Matrix With Low Power Consuption at 1.55 $\mu$m, Electronic Letters, vol. 31 No. 5, Mar. 1995.

Hida Y. and Imamura S., Influence of Temperature and Humidity Change on Optical Waveguide Circuits Composed of Deuterated and Fluorinated Methacrylate Polymers, Jpn. J. Appl. Phys, vol. 34, pp. 6416–6422, Dec. 1995.

Ooba N. et al., Photonic Device Applications of Low Loss Acrylic Polymer Waveguides, Proc. ACS PMSE, vol. 75, pp. 362–363, 1996.

Horsthuis and Lytel, Prospects for Integrated Optic Polymer Components, *Akzo Nobel Electronic Products*, The Netherlands, Apr. 1995.

Borreman, et al, Polymeric 8×8 Digital Optical Switch Matrix, *Akzo Nobel Central Research*, 22nd European Conference on Optical Communication, The Netherlands, ECOC 1996.

Keil, et al, A Novel Type of 2×2 Digital Optical Switch Realized by Polymer Waveguide Technology, *Heinrich–Hertz Institu für Nachrichtentechnik Berlin, GmbH, Materials Technology Department*, Berlin Germany, 22nd European Conference on Optical Communication, ECOC 1996.

Diemeer, et al, Polymeric Phased Array Wavelength Multiplexer Operating Around 1550 nm, *Electronics Letters*, pp. 1132–1133, Jun. 6, 1996, vol. 32, No. 12.

Takiguchi, et al, Fabrication of the Add/Drop Multiplexer (ADM) and Tests, 1995 General Meeting of the Institute of Electronics, Information and Communication Engineers, p. 254, 1995.

*Primary Examiner*—Margaret G. Moore
*Attorney, Agent, or Firm*—Workman, Nydegger and Seeley

[57] ABSTRACT

In a digital thermo-optic switch and an optical ADM filter of the present invention, functional components such as a splitter and a grating structure part formed in the course of an optical circuit as a component are composed of silicone materials which are superior in heat resistance, reduced loss, and low birefringence, thereby achieving sufficiently practical thermal stability, low loss at 1.55 to 1.58 $\mu$m band, wavelength selectivity, and cost reduction.

5 Claims, 14 Drawing Sheets

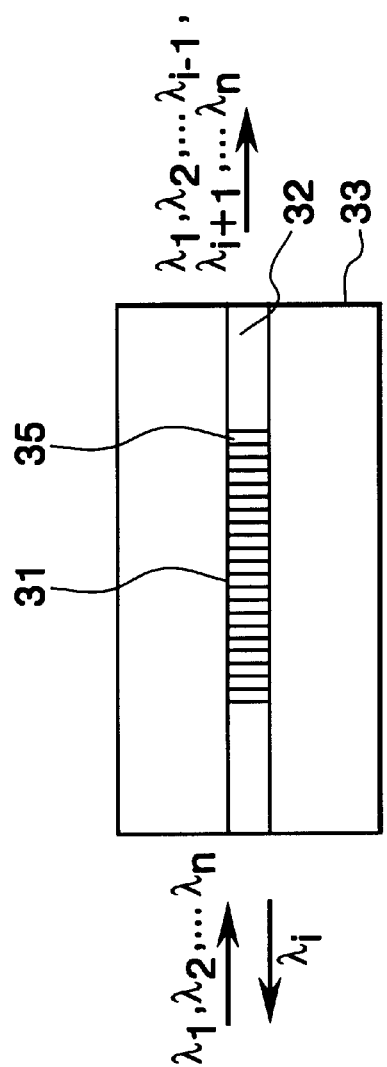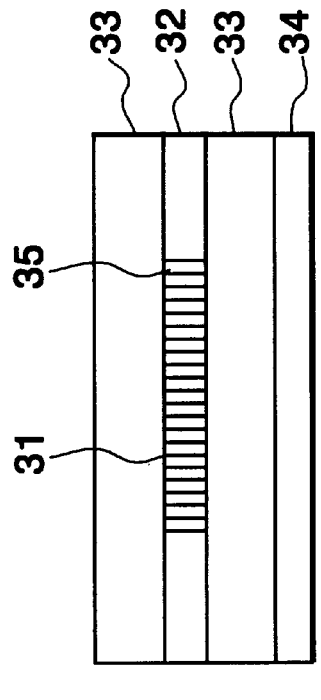
FIG.10A PLAN DIAGRAM
FIG.10B SECTIONAL DIAGRAM ALONG LONGITUDINAL DIRECTION OF CORE 32

SECTIONAL DIAGRAM
ALONG OPTICAL GRATING
STRUCTURE PART 51

THERMO-OPTIC DEVICES

This application is based on applications Nos. 13,249/1997 filed Jan. 9, 1997 in Japan, 82,375/1997 filed Mar. 17, 1997 in Japan and 146,572/1997 filed Jun. 4, 1997 in Japan, the content of which is incorporated hereinto by reference.

BACKGROUND OF THE INVENTION

1. Field of the Invention

The present invention relates to high-performance and low-cost thermo-optic devices for use in wavelength division multiplexing (WDM) optical communication systems, more specifically to a digital thermo-optic switch and a tunable wavelength filter having an optical add/drop multiplexer (ADM) function which are superior in thermal stability, low in optical propagation loss at 1.55 to 1.58 $\mu$m band, superior in wavelength selectivity, and low in production costs.

2. Description of the Related Art

As already known, a wavelength division multiplexing (WDM) optical communication system is a network system aiming for an increased transmission capacity by multiplexing wavelength different signals in the transparent wavelength in the transmittable wavelength band of the optical transmission path. The mainstream of optical communication in the future is being determined to be the wavelength division multiplexing optical communication. Recently, practical applications of lightwave communication technology begin to spread in areas of not only linking of signals, that is, transmission, but also in node of signals, that is, switching, and towards the area of signal processing.

Presently, in the U.S. and Europe, test beds of wavelength division multiplexing network are being carried out. In the test bed, strict brush-up is continued towards practical applications of various devices/components such as lasers, amplifiers, switches, filters, and wavelength converters. In the present stage, prospective candidates are not yet obtained other than in lasers and amplifiers. For example, speaking about switches, those which are operating in principles of electro-optic effect, thermo-optic effect, Stark effect, and acousto-optic effect are desperately competing. As to materials, various switches composed of ferroelectric crystals, glass, polymers, semiconductors, and the like are intensively competing. In the future, those parts which are superior in characteristics and have high practical applicabilities will be selected.

The above-described node for wavelength multiplexing specifically indicates optical path cross-connects for direct switching the optical path without O/E–E/O conversion, as is, or a wavelength selection gate, a so-called add/drop filter, which passes through a signal of a specific wavelength allocated per user.

As a selection switch which is the key of the cross connect system, not only of a high switching performance, one which has a simple control system, is wide in operation tolerance, high scalability and upgradability, and high in compactness is in demand in view of practical applications.

Further, the optical filter for achieving the optical add/drop function is required to be a device which is even higher in handling workability and costeffectivity than the optical path cross-connect switch since it is used in a hierarchy one step closer to the user than the optical path cross-connects in the network construction.

In the following, prior art of each of the above-described optical waveguide type thermo-optic switch, optical filter, and tunable wavelength filter will be described in further detail.

As the optical waveguide material, in the past, inorganic glass superior in transparency has been mainly used. However, inorganic glass has problems of being heavy and fragile, high in production cost, and the like, and recently, in place of inorganic glass, a movement is becoming active to use a transparent polymer having windows at optical communications wavelength regions (1.3 $\mu$m and 1.55 $\mu$m bands) in fabrication of single mode optical waveguide devices). Polymeric materials are easy for thin film formation by spin coating, dipping, or the like, and are thus suitable for producing large-area optical waveguides. Further, polymeric materials are high in potential to cost reduction as compared with glass-based and semiconductor-based optical waveguides, because the production is basically by a low-temperature process, development to reproduction is easy such as by mass production using embossing process. For such reasons, optical integrated circuits used in the area of optical communications and optical waveguide devices such as optical circuit boards used in the area of optical information processing are expected to be produced in large amounts and low costs using polymeric materials. Polymethylmethacrylate (PMMA) and other various transparent polymers are proposed, and research and development is intensively conducted in the production of optical waveguides using the polymers.

Yet further, of various optical waveguide devices, a digital thermo-optic switch comprising polymers in both core and cladding is an optical device sufficiently utilizing a superiority of polymer that the thermo-optic (TO) coefficient of polymeric materials is greater by a factor of 10 than inorganic glass material, which is actively being studied and developed in various organizations as a promising candidate of optical path switch used in optical path cross-connects and optical add/drop multiplexer in photonic transport networks. Recent advances are detailed in, for example, W. Horsthuis et al., ECOC95, pp. 1059–1062 (1995); N. Keil et al., Electron. Lett., vol. 31, pp. 403–404 (1995), Ooba et al., Proc. ACS PMSE, vol. 75, pp. 362–363 (1995), and the like. In particular, the polymeric digital thermo-optic switches reported by Horsthuis, Ooba et al., are greater in operation tolerance and smaller in wavelength dependence than the interference type phase difference switch by Keil et al., and are thus considered to be advantageous in practical application.

However, since digital type is in principle requires a large refractive index change compared to interference type, it is large in thermal load and has higher thermal resistance requirement for the material. For example, 1×2 thermo-optic switch module AK-SY1023SNC commercialized by Akzo Co. is specified to have operating temperatures of 17° C. to 27° C. for warranting stable operation of a cross-talk of –17 dB. Further, Ooba et al. report that in a thermo-optic switch using a PMMA-based polymer, reliability cannot be guaranteed because the waveguide temperature exceeds glass transition temperature specific to the material when applied power exceeds 130 mW at room temperature.

As described above, in consideration of device application of a polymeric optical waveguide, heat resistance has been regarded to be the most important problem, and recently, a material of improved heat resistance by containing an aromatic group such as benzene ring or using a silicone backbone (for example, those disclosed in Japanese Patent Application Laid-open No. 43423/1991, 328504/1992, and the like). However, introduction of such an aromatic group or a rigid main chain backbone is very effective for improving heat resistance, on the other hand, considerably tends to result in increased birefringence or degradation of film forming properties and processability (such as cracking). Therefore, no materials having well-balanced heat resistance, low birefringence, and film forming properties, and the like have heretofore been known. As described above, current polymeric digital thermo-optic switches yet have material dependent problems such as heat resistance or low propagation loss in 1.55 to 1.58 μm band, and really practical devices have yet to be developed.

In the wavelength filter, when a polymeric material is used as described above, peak wavelength of the wavelength filter can be changed over a wide range utilizing the thermo-optic effect. FIG. 1 is a schematic diagram showing the structure of an example of wavelength filter using an arrayed-waveguide grating. In FIG. 1, reference numerals 1 and 2 indicate input and output waveguides, respectively, 3 and 4 are slab waveguides, and 5 is an arrayed waveguide comprising a plurality of channel waveguides having different optical path lengths. Light inputted from one port of the input waveguide 1 is diffracted by the slab waveguide 3 and distributed to respective channels of the arrayed waveguide 5. Light transmitting the arrayed waveguide 5, after given with a phase difference according to respective optical path length, is focused by the slab waveguide 4 and outputted from the output waveguide 2. At this moment, focused port differs according to the phase difference given in the arrayed waveguide 5. Therefore, only light in a specific wavelength band is transmitted and outputted from one port of the output waveguide 2. When light is inputted from the central port of the input waveguide 1, a peak wavelength λ0 of light transmitted from the central port of the output waveguide 2 is given by the following formula:

$$\lambda 0 = (n_c \cdot \Delta L)/N$$

(wherein $n_c$ is an effective refractive index of each channel of the arrayed waveguide 5, $\Delta L$ is an optical path length difference between respective channels, and N is an order of diffraction). From formula 1, it can be seen that peak transmission wavelength is proportional to the effective refractive index of the arrayed waveguide 5. Since polymeric material has large TO coefficient by a figure compared to inorganic glass material, a wavelength filter using a polymeric material, when the peak wavelength is varied utilizing the thermo-optic effect, can provide a tunable wavelength range wider by a figure compared to that using inorganic glass material. For example, in formula 1, when $\Delta L=126$ μm, N=119, since temperature dependence of effective refractive index of PMMA-based polymer is $1 \times 10^{-4}/°$ C., the peak wavelength can be changed at a rate of −0.12 nm/° C. Therefore, the peak wavelength can be changed by about 6.4 nm by a temperature change of about 55° C. This peak wavelength change corresponds to a change of 800 GHz when converted to optical frequency of 1.55 μm light. For the case of inorganic glass material, temperature change required for obtaining the above frequency change is about 550° C., which is not practical. For the above reasons, an arrayed waveguide grating type wavelength filter having a wide tunable wavelength range has been produced using polymer waveguides and reported (Japanese Journal of Applied Physics, vol. 34, pp. 6416–6422 (1995)).

However, the above-reported wavelength filter using PMMA-based polymer had a problem of insufficient heat resistance when the peak wavelength is changed by temperature change, because glass transition temperature of the material is about 100° C. Therefore, temperature variation range of this wavelength filter is limited to less than 80° C. and, as a result, the tunable wavelength range is restricted. For example, in formula 1, when $n_c=1.46$, $\Delta L=126$ μm, N=119, free spectral range (FSR) of the wavelength filter is 12.9 nm, which corresponds to 1600 GHz, that is, 8 channels at 200 GHz intervals, or 16 channels at 100 GHz intervals. Here, FSR means a wavelength interval to the next diffraction order. That is, tunable wavelength range of the wavelength filer is limited to FSR. A variable wavelength range over the entire FSR is wide enough for tunable wavelength filters to select one of the all channels multiplexed in the FSR. However, since temperature dependence of an effective refractive index of the PMMA-based polymer is $-1.1 \times 10^{-4}/°$ C., a peak wavelength variable range is 6.4 nm, which corresponds to temperature change of 55° C., that is, temperature change from room temperature (25° C.) to the upper limit (80° C.) of usable temperature of PMMA. Then tuning of peak wavelength over the entire FSR has been difficult. Therefore, to achieve a wavelength filter of which the peak wavelength is variable over the entire FSR, development of a polymeric waveguide material of higher heat resistance has been required.

From the above reasons, recently materials of improved heat resistance by containing an aromatic group such as benzene ring or using a silicone backbone are reported (for example, Japanese Patent Application Laid-open Nos. 43423/1991, 328504/1992, and the like). However, such introduction of an aromatic group or a rigid main chain backbone is very effective for improving heat resistance, on the other hand, considerably tends to result in increased birefringence or degradation of film forming properties and processability (such as cracking). Therefore, no materials having well-balanced heat resistance, low birefringence, and film forming properties, and the like have heretofore been known. Therefore, current polymeric waveguide type wavelength filters have yet remain heat resistance problems of materials.

Still further, as wavelength filters having the add/drop multiplexing (ADM) function, there are an arrayed waveguide grating (AWG) filter by a silica planar lightwave circuit (PLC), a wavelength-fixed fiber grating filter, a tunable acousto-optic filter, a mechanical-driven type dielectric multilayer filter. Among these, the fiber grating is the most advanced in terms of performance and reliability, however, it has a major disadvantage in that it is not suitable for tuning and mass production. In the above-described wavelength division multiplexing (WDM) network system, an optical circuit for splitting optical signal (channel) of a specific wavelength from wavelength division multiplexing optical signals or for multiplexing the signal, that is, an add/drop multiplexer (ADM) system is required. Since the ADM system has a nature to be widely developed towards user systems and access systems, devices used therein are essentially required to be high in reliability and low in costs.

SUMMARY OF THE INVENTION

With a view to solve the problems of the above-described prior art digital thermo-optic switches and optical ADM filters, an object of the present invention is to provide high-performance and low-cost digital optical switch and tunable wavelength filter for use in WDM networks.

The present invention uses silicone materials which are superior in heat resistance, reduced loss, and low birefringence for functional parts such as a splitter and a grating structure formed in the course of an optical circuit of which a digital thermo-optic switch and an optical ADM filter are composed. Thereby the present invention can obtain a digital thermo-optic switch and an optical ADM filter which achieves sufficiently practical thermal stability, low loss at 1.55 to 1.58 μm band, wavelength selectivity, and cost reduction.

A digital thermo-optic switch of the present invention comprising a polymeric optical splitter and a heating element:

wherein the polymeric optical splitter is formed of a polymer obtained by thermosetting a copolymer having components represented by formulae (I), (II), (III) and (IV),

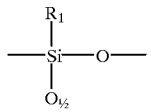
(I)

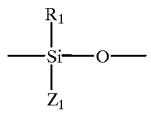
(II)

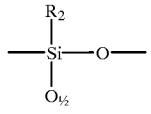
(III)

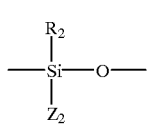
(IV)

[in formulae (I) and (II), $R_1$ is deuterated phenyl group or halogenated phenyl group represented by $C_6X_5$ (X denotes deuterium or halogen), and Z is hydroxy group or an alkoxy group represented by $OC_mH_{2m+1}$ (m is an integer of 3 or less); in formulae (III) and (IV), $R_2$ is an alkyl group, a deuterated alkyl group or a halogenated alkyl group represented by $C_nY_{2n+1}$ (Y denotes hydrogen, deuterium or halogen, and n is a positive integer), and Z is hydroxy group or an alkoxy group represented by $OC_mH_{2m+1}$ (m is an integer of 3 or less)];

and having a weight-averaged molecular weight of 10000 or less.

A polymeric waveguide wavelength filter of the present invention including a polymeric optical waveguide having a waveguide filter function:

wherein the polymeric optical waveguide is formed of a polymer obtained by thermosetting a copolymer having components represented by formulae (I), (II), (III) and (IV),

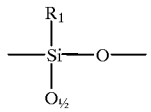
(I)

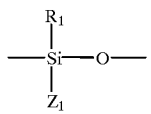
(II)

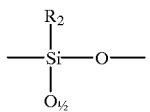
(III)

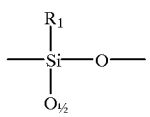
(IV)

[in formulae (I) and (II), $R_1$ is deuterated phenyl group or halogenated phenyl represented by $C_6X_5$ (X denotes deuterium or halogen), and Z is hydroxy group or an alkoxy group represented by $OC_mH_{2m+1}$ (m is an integer of 3 or less); in formulae (III) and (IV), $R_2$ is an alkyl group, a deuterated alkyl group or a halogenated alkyl group represented by $C_nY_{2n+1}$ (Y denotes hydrogen, deuterium or halogen, and n is a positive integer), and Z is hydroxy group or an alkoxy group represented by $OC_mH_{2m+1}$ (m is an integer of 3 or less)];

and having a weight-averaged molecular weight of 10000 or less.

Here, the polymeric waveguide wavelength filter may further comprise a temperature controller enabling optionally separating or mixing optical signal of a specific wavelength by controlling temperature of polymeric waveguide.

A polymeric optical waveguide tunable wavelength filter of the present invention comprising an optical circuit for making input/output and mixing or split of lightwave, a grating structure part formed in the course of optical waveguide constituting the optical circuit, and a temperature controller enabling optionally separating or mixing optical signal of a specific wavelength transmitting in the optical circuit by controlling temperature of the grating structure part:

wherein at least the grating structure part of the optical waveguide is formed of a polymer obtained by thermosetting a copolymer having components represented by formulae (I), (II), (III) and (IV),

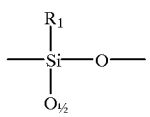
(I)

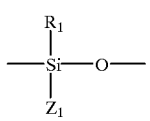
(II)

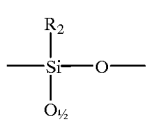
(III)

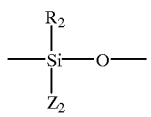

(IV)

[in formulae (I) and (II), $R_1$ is deuterated phenyl group or halogenated phenyl group represented by $C_6X_5$ (X denotes deuterium or halogen), and Z is hydroxy group or an alkoxy group represented by $OC_mH_{2m+1}$ (m is an integer of 3 or less); in formulae formulae (III) and (IV), $R_2$ is an alkyl group, a deuterated alkyl group or a halogenated alkyl group represented by $C_nY_{2n+1}$ (Y denotes hydrogen, deuterium or halogen, and n is a positive integer), and Z is hydroxy group or an alkoxy group represented by $OC_mH_{2m+1}$ (m is an integer of 3 or less)];

and having a weight-averaged molecular weight of 10000 or less.

Here, the temperature controller may be a local heater provided in the vicinity of the grating structure part for heating only the vicinity of the grating structure part.

With the thermo-optic devices of the above construction according to the present invention, optical switches and tunable wavelength filters which are essential for optical path cross-connects and optical ADM in wavelength division multiplexing optical communication networks can be provided in compact and at low costs while maintaining the high functions. Therefore, the thermo-optic devices according to the present invention can greatly contribute to the advance in optical communication networks such as expansion of optical path cross-connect node and development of optical access networks. Further, the present invention can be utilized as components of user type optical closed networks (WDM-LAN) which are expected to remarkably progress in the future.

The above and other objects, effects, features and advantages of the present invention will become more apparent from the following description of embodiments thereof taken in conjunction with the accompanying drawings.

BRIEF DESCRIPTION OF THE DRAWINGS

FIG. 10A is a schematic plan diagram showing the tunable wavelength filter according to the present invention having a refractive index modulation type grating structure;

FIG. 10B is a schematic sectional diagram taken along a longitudinal direction of core of the tunable wavelength filter shown in FIG. 10A;

Figure 1:
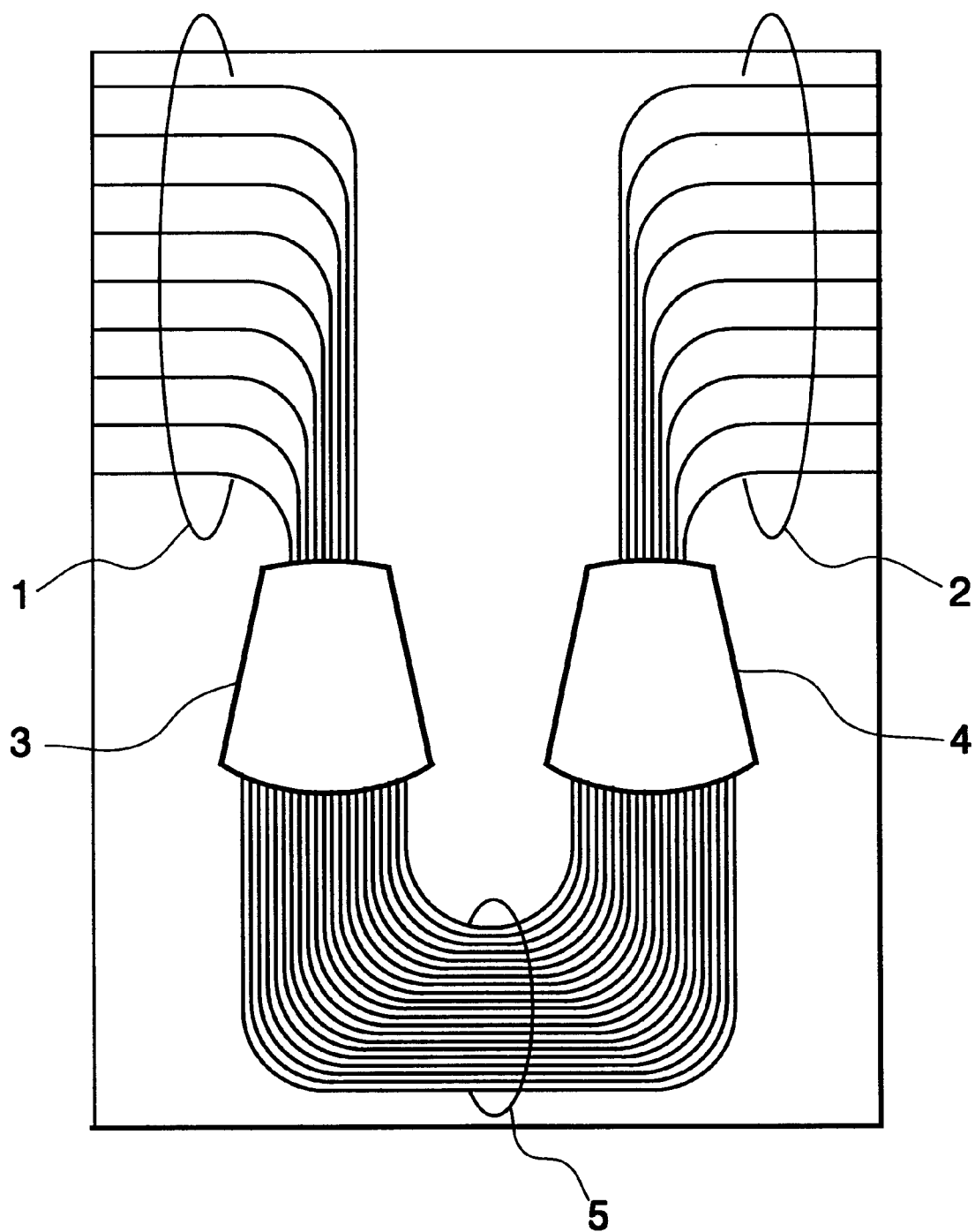
FIG. 1 is a schematic plan diagram showing the structure of an example of prior art optical waveguide type wavelength filter.

DETAILED DESCRIPTION OF PREFERRED EMBODIMENTS (Digital thermo-optic switch)

With the aim of solving the prior art problems of digital thermo-optic switch, the inventors have fabricated a digital thermo-optic switch using a thermosetting silicone oligomer which is capable of providing both high heat resistance and low birefringence, and found that it has no cracking, highly transparent waveguide characteristics, is independent on polarization, and can provide a very stable digital switching operation even at high temperatures. The digital thermo-optic switch according to the invention has been achieved on the basis of such findings.

Here, the thermosetting silicone oligomer has a superior heat resistance since it is a material having a ladder-type silicone structure as molecular backbone. Further, since hydrogen of C—H bond contained in the side chain is substituted with deuterium or halogen, absorption in near-infrared region due to overtone or combinational tone of stretching or deformation vibration of C—H bond is considerably reduced. Still further, by using a material of a type of thermosetting oligomer having a weight-averaged molecular weight of less than 10000, optical anisotropy generated in the thin film formation can be suppressed, and the polymer material obtained after thermosetting is remarkably reduced in birefringence.

Specifically, in the present invention, a polymeric optical waveguide obtained by thermosetting silicone oligomer is used as an optical splitter in the polymeric digital thermo-optic switch, thereby achieving a highly heat-resistant, really practical digital thermo-optic switch.

The digital thermo-optic switch according to the present invention will be described in detail below.

Silicone oligomer used in the optical switch of the present invention is a partially laddered-type silicone oligomer obtained, for example, by co-hydration condensation of deuterated phenyl trichlorosilane and methyl trichlorosilane, having a weight-averaged molecular weight of less than 10000. By thermosetting the oligomer, a cured film can be obtained which is high in heat resistance, small in birefringence, and high cracking resistance. As to the thermosetting conditions, heating at 150 to 250° C. for one to several hours is preferable.

When the thermo-optic switch is fabricated using the thermosetting silicone which is high in heat resistance and superior in cracking resistance, the production process can be carried out as follows.

First, refractive index adjustment of silicone oligomer is made according to the waveguide mode required for the Y-branching optical waveguide in the thermo-optic switch, and at least two types of silicone oligomers having an exactly controlled refractive index difference are prepared as core and cladding materials. Magnitude of refractive index difference is determined according to the mode of waveguided lightwave and core size, for example, in order to match the mode diameter of an optical fiber with that in the waveguide, cross-section of core is preferably an 8 µm square, and the refractive index difference is preferably about 0.3%. In the case of thermosetting silicone used in the present invention, refractive index of finally obtained optical waveguide thin film can be adjusted by the composition of the raw materials, that is, mixing ratio of deuterated phenyl trichlorosilane and methyl trichlorosilane.

Next, the cladding material with an adjusted refractive index is coated on a substrate such as silicon and cured to form a lower cladding.

Further, on the lower cladding a core material is coated and cured. Here, since the cladding material and core material are coated in the state of oligomer, orientation of molecular chain during film formation is suppressed resulting in decreased birefringence.

Next, a layer to be an etching mask is formed on the core, and processed into a waveguide pattern by photolithography or the like. As the etching mask, an organic photoresist or metal is used. Still further, the core is processed into a desired Y-branching optical waveguide pattern by reactive ion etching, and on top of which an upper cladding is coated and cured. The thus fabricated Y-branching optical waveguide using thermosetting silicone is an ideal optical waveguide that is superior in heat resistance, transparent in both communication wavelength bands of 1.3 µm and 1.55 µm, and has no polarization dependence.

Yet further, a metal thin film is stacked on the cladding of the Y-branching optical waveguide by sputtering and patterned by photolithography or the like to form a thin film heater. The thus fabricated polymeric digital thermo-optic switch exhibits ideal digital switching characteristics with superior heat resistance and without polarization dependence.

Embodiment 1

Figure 2:
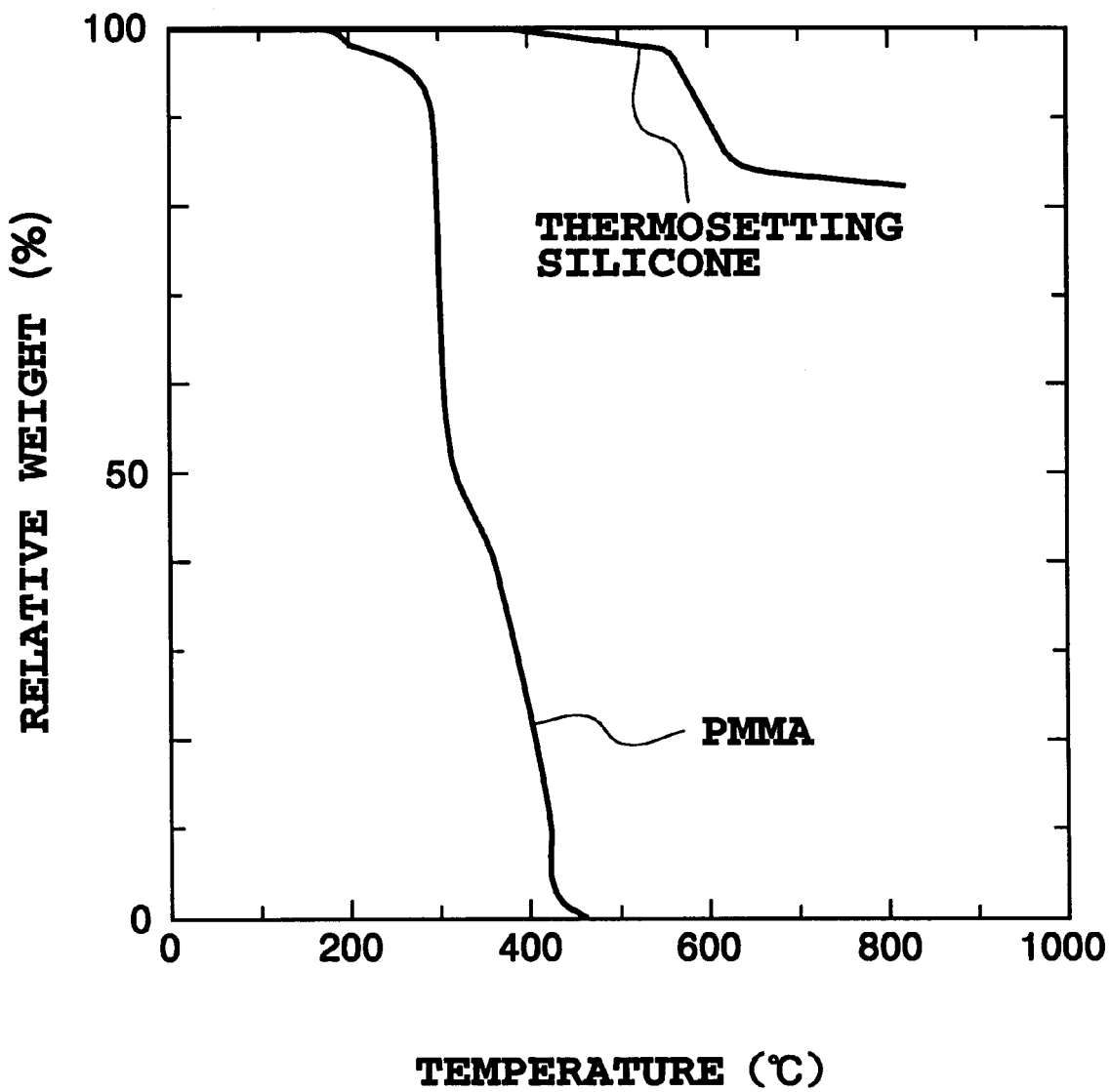
FIG. 2 is a graph showing thermo-gravimetric analysis curves of thermosetting silicone and PMMA used in the optical switch according to the present invention.

Deuterated phenyl trichlorosilane and methyl triethoxysilane (53:47 in molar ratio) were dissolved in dehydrated toluene, and slowly added dropwise into a water-THF-toluene mixture agitated in an ice bath. After reacting for 5 hours, organic layer was separated and washed with water while neutralizing, after being allowed to stand, an insoluble matter separated from the organic layer was filtered and dried. The organic solvent was completely distilled out under vacuum, the resulting white solid was dissolved in ethanol, a small amount of hydrochloric acid was added, and heat refluxed. Ethanol was distilled out under vacuum, thoroughly washed with toluene-water system while neutralizing, the organic layer was separated, after drying, toluene was distilled out under vacuum to obtain a white solid. The molecular weight was about 3000. Thermogravimetric analytical results of a heat cured matter of this material are shown in FIG. 2 comparing with those of PMMA. By the analytical results, thermal stability of thermosetting silicone according to the present invention is sufficiently shown. When the above silicone oligomer is used as the core material, the cladding material was synthesized as follows. Using the same procedure as in the above core material synthesis, a white solid was obtained from deuterated phenyl trichlorosilane and methyl triethoxysilane (1:1 in molar ratio). The molecular weight was about 3600. The core material and the cladding material were respectively formulated into jig-lime solutions and spin coated. The spin coated films were heat cured at 250° C. for 1 hour, and measured for refractive index in optical communication wavelength regions. Measurement results of refractive index are shown in Table 1.

TABLE 1

|  | Wavelength 1.3 µm (TE/TM) | Wavelength 1.55 µm (TE/TM) |
| --- | --- | --- |
| Thermosetting silicone (core) | 1.5040/1.5039 | 1.5020/1.5019 |
| Thermosetting silicone (clad) | 1.4995/1.4994 | 1.4975/1.4974 |
| Relative refractive index difference (%) | 0.3 | 0.3 |

A Y-branching optical waveguide was fabricated using the above two types of silicone oligomers for the core and cladding. First, cladding silicone oligomer was coated on a silicon substrate by spin coating to form a film. At this moment, rotation speed of spin coater was adjusted so that the film thickness was 20 µm. The resulting thin film was cured by heating at 200° C. for 2 hours to obtain a lower cladding layer. Then, on top of the lower cladding layer, core silicone oligomer was coated in a condition to obtain a film thickness of 8 µm, which was cured at 200° C. for 2 hours. Next, a copper thin film was stacked by sputtering and a Y-branching optical waveguide mask pattern was formed by photolithography and ion milling. Total length of the splitter was 2 cm. Further, the core layer of the part other than the mask pattern was removed by reactive ion etching to form a rectangular core ridge of 8 µm in width and 8 µm in height. After the etching mask was removed, cladding silicone oligomer was coated on top, cured as in the formation of the lower cladding to form an embedded type channel optical waveguide comprising a core/cladding structure. Thickness of the upper cladding was 10 µm from the upper surface of the core.

Figure 3:
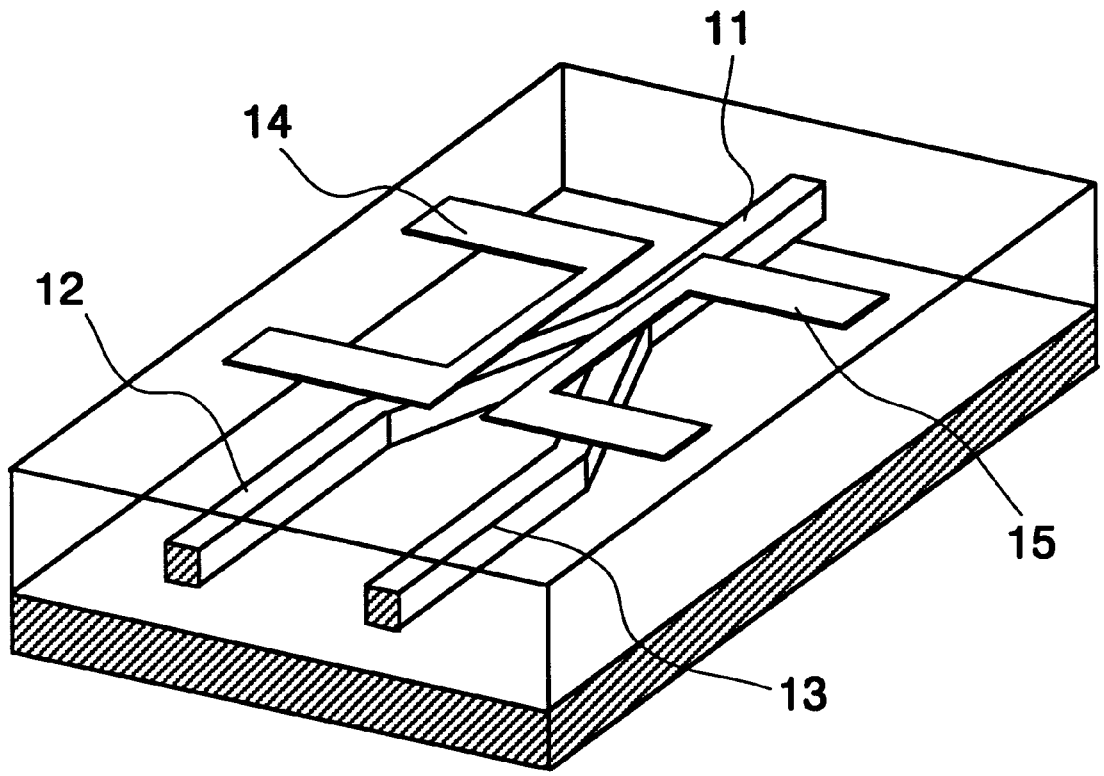
FIG. 3 is a schematic perspective diagram of the polymeric digital thermo-optic switch according to the present invention.
Figure 4:
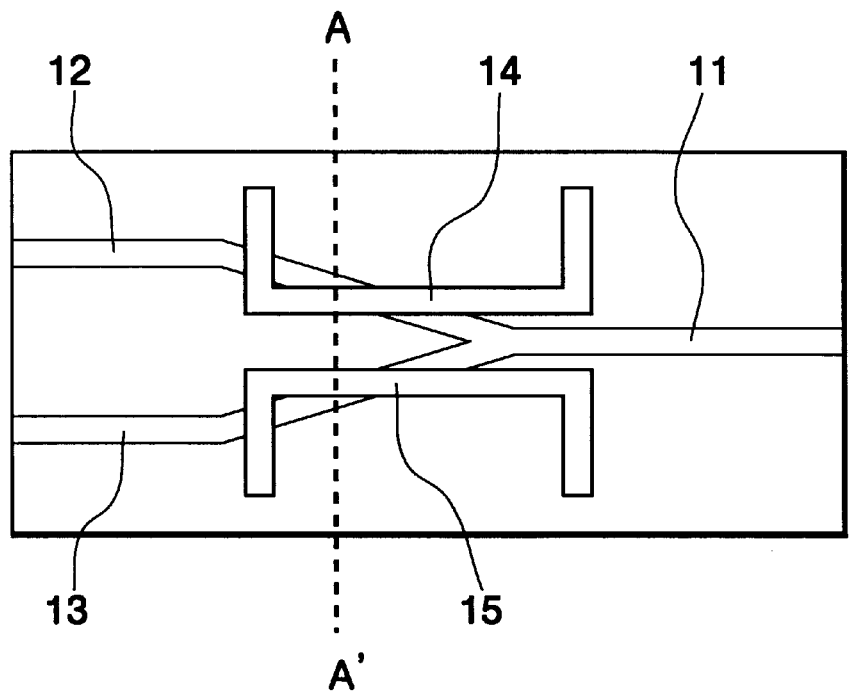
FIG. 4 is a schematic plan diagram of the optical switch shown in FIG. 3.
Figure 5:
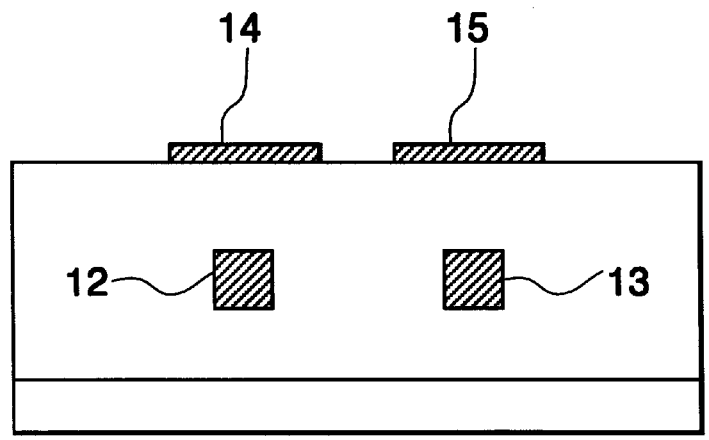
FIG. 5 is a schematic sectional diagram taken along line A–A' of FIG. 4.

Yet further, a metal film was stacked by sputtering on the upper cladding of the Y-branching optical waveguide. Finally, the metal film was patterned by photolithography and ion milling to form a thin film heater. Schematic diagrams of the resulting digital thermo-optic switch are shown in FIG. 3 to FIG. 5. Specifically, FIG. 3 is a schematic illustration showing the structure of an example of the polymeric digital thermo-optic switch according to the present invention. FIG. 4 is a schematic plan diagram of the switch shown in FIG. 3. FIG. 5 is a schematic sectional view taken along A–A' plane in FIG. 4. In FIGS. 3 to 5, reference numeral 11 indicates an input waveguide of optical splitter, 12 and 13 are output waveguides of the optical splitter. Numerals 14 and 15 are thin film heaters.

A polarization-maintaining optical fiber was butt coupled to the input waveguide 11 of the optical splitter and single-mode optical fibers to the output waveguides of the optical splitter, and laser light was applied from the input side optical fiber. With this arrangement, first in a condition of not applying current to the thin film heaters 14 and 15, insertion loss was measured, which was 3.5 dB at wavelength 1.3 μm and 4.0 dB at wavelength 1.55 μm. Further, polarization dependence of insertion loss was within 0.1 dB. From these results, it was demonstrated that the optical splitter used in the present invention is a single-mode waveguide of very high quality which is low in insertion loss and small in polarization dependence.

Figure 6:
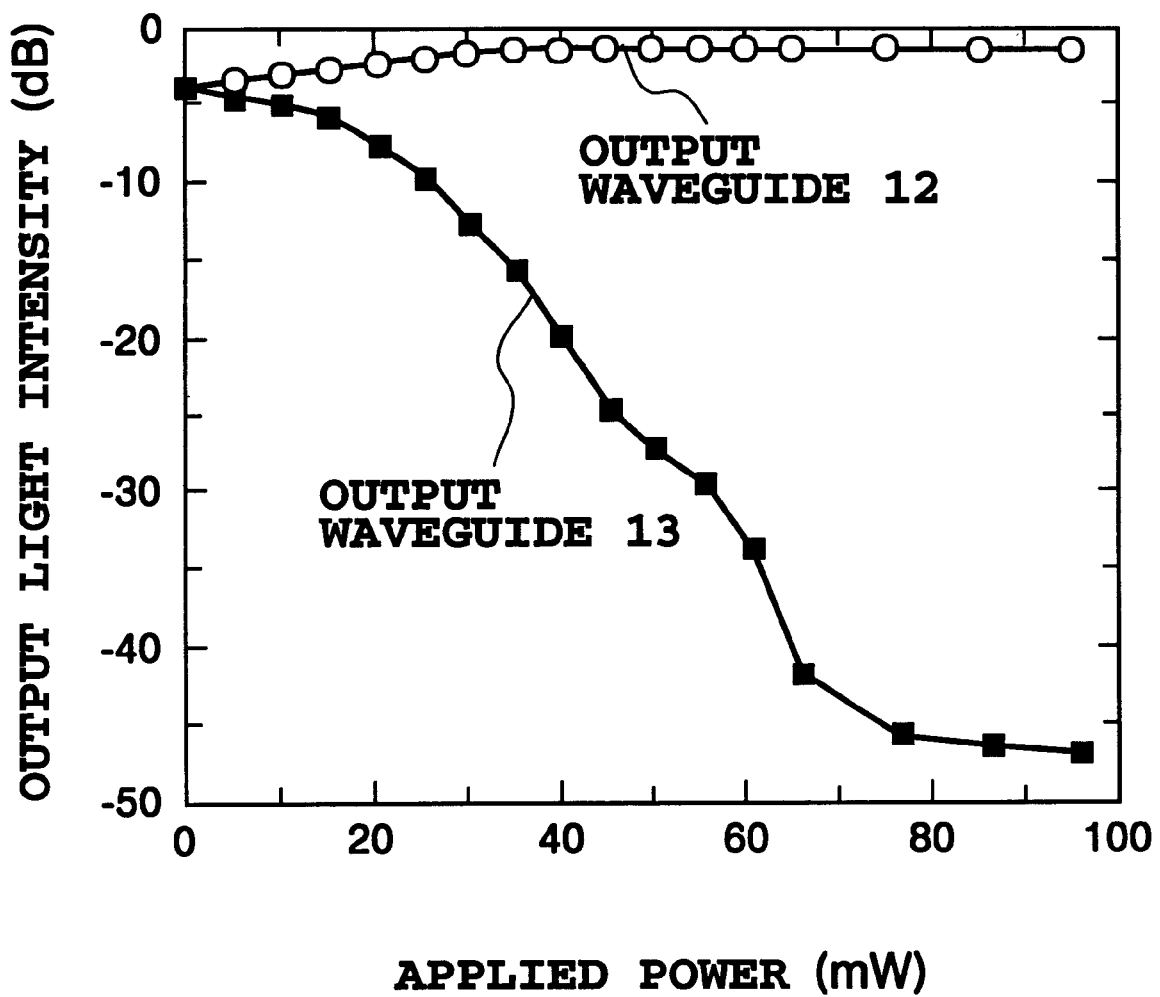
FIG. 6 is a graph showing switching characteristics of the digital thermo-optic switch according to the present invention.

Next, the thin film heater 15 on the output waveguide 13 was applied with a current for heating. The relationship between heating power and output light intensity measured at wavelength 1.55 μm is shown in FIG. 6. That is, FIG. 6 shows switching characteristics of the digital thermo-optic switch according to the present invention. In FIG. 6, the axis of ordinates indicates output light intensity (dB) and the axis of abscissas indicates applied power (mW). In FIG. 6, black squares represent output light intensity from the output waveguide 13, and white circles represent output light intensity from the output waveguide 12. As can be seen from FIG. 6, an optical switch is achieved which has switching characteristics of an insertion loss of 1 dB and an extinction ratio of more than 30 dB with an applied power of 60 mW. Further, polarization dependence of insertion loss was within 0.1 dB.

Next, the thin film heater 14 on the output waveguide 12 was applied with a current for heating. In this case, almost the same results were obtained as characteristics when output light intensities from the output waveguides 12 and 13 are exchanged in FIG. 6.

Figure 7:
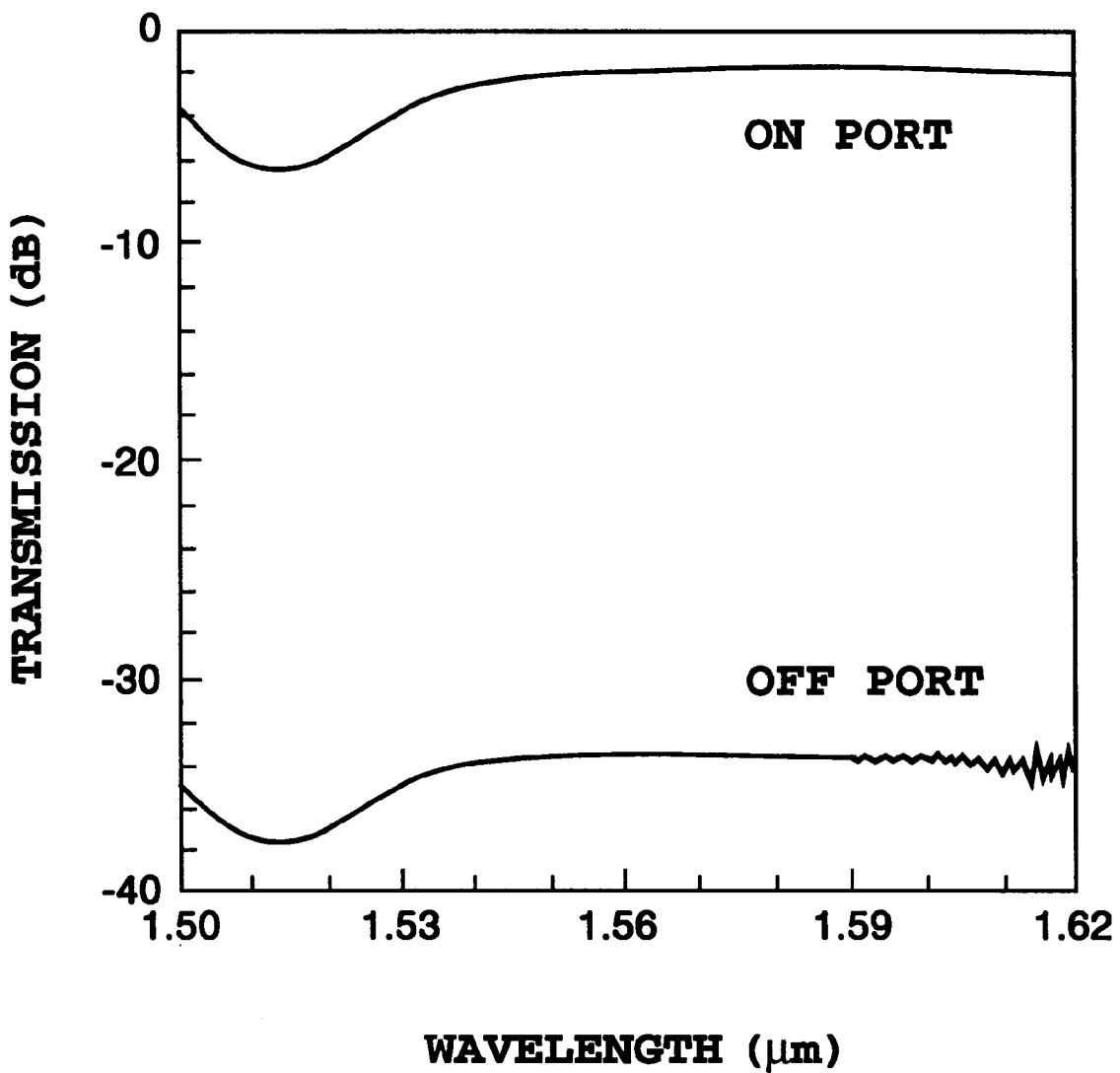
FIG. 7 is a graph showing wavelength dependence of output of the polymeric digital thermo-optic switch according to the present invention.

Further, the same experiment was carried out using a 1.55 μm tunable wavelength laser light source, and wavelength dependence of characteristics were measured when the switch was operated at 60 mW. FIG. 7 shows output light intensities of respective port waveguides. It can be seen from the figure that the optical switch according to the present invention maintains the characteristics in a broad wavelength region of 1.55 μm, and can be applied to WDM application using a wide wavelength region.

Yet further, the same experiment was carried out at a wavelength of 1.3 μm, and the same results as at 1.55 μm, that is, an insertion loss of 0.5 dB and an extinction ratio of more than 30 dB with a power of 60 mW, were obtained.

Embodiment 2

Using the method described in Embodiment 1, a core material and a cladding material were synthesized from deuterated phenyl trichlorosilane and methyl triethoxysilane. However, molar ratio of monomers was 80:20 for the core material and 74:26 for the cladding material. Weight-averaged molecular weights of the core material and the cladding material were 2000 in both materials. Using these core and cladding materials, a polymeric digital thermo-optic switch was fabricated according to the method described in Embodiment 1. When switching characteristics of the optical switch were compared at humidities of 10%, 50%, and 90% at room temperature, almost no effects of humidity were noted, the insertion loss was 1 dB and the extinction ratio was more than 30 dB. Further, also in a heat cycle test (−10° C. to 60° C.) when continuously operating at 60 mW driving, the insertion loss was almost unaffected and was constant.

Embodiment 3

Using the method described in Embodiment 1, a core material and a cladding material were synthesized from deuterated phenyl trichlorosilane and methyl triethoxysilane. However, molar ratio of monomers was 30:70 for the core material and 28:72 for the cladding material. Weight-averaged molecular weights of the core material and the cladding material were 8000 in both materials. Using these core and cladding materials, a polymeric digital thermo-optic switch was fabricated according to the method described in Embodiment 1. When the optical switch was operated at a temperature of 100° C., the extinction ratio was more than 30 dB.

(Polymeric optical waveguide type wavelength filter)

For solving problems of the prior art wavelength filter, the inventors have fabricated a polymeric optical waveguide type wavelength filter using a thermosetting silicone oligomer which is capable of providing both high heat resistance and low birefringence, and found that it has no cracking, highly transparent waveguide characteristics, is small in polarization dependence, and can provide very stable characteristics even at high temperatures. Further, the inventors mounted the wavelength filter on a temperature controller, and examined changes with temperature of its peak wavelength, and found that the polymeric optical waveguide fabricated using the thermosetting silicone oligomer had a relatively high thermo-optic coefficient of $-1.7 \times 10^{-4}/°$ C. As a result, the inventors have found that the peak wavelength can be tuned in a wide range according to the refractive index change with the temperature change, and accomplished the wavelength filter of the present invention.

The thermosetting silicone oligomer has a superior heat resistance since it is a material having a ladder-type silicone structure as molecular backbone. Further, since hydrogen of C—H bond contained in the side chain is substituted with deuterium or halogen, absorption in near-infrared region due to overtone or combinational tone of stretching or deformation vibration of C—H bond is considerably reduced. Still further, by using a material of a type of thermosetting oligomer having a weight-averaged molecular weight of less than 10000, optical anisotropy generated in the thin film formation can be suppressed, and the polymer material obtained after thermosetting is remarkably reduced in birefringence.

That is, in the present invention, by constructing an optical waveguide type wavelength filter using a polymer obtained by thermosetting silicone oligomer, a polymeric optical waveguide type wavelength filter having a high heat resistance and a wide tunable wavelength range can be achieved.

The polymeric optical waveguide type wavelength filter according to the present invention will be described in detail below.

Silicone oligomer used in the wavelength filter of the present invention is a partially laddered-type silicone oligomer obtained, for example, by co-hydration condensation of deuterated phenyl trichlorosilane and methyl trichlorosilane, having a weight-averaged molecular weight of less than 10000. By thermosetting the oligomer, a cured film can be obtained which is high in heat resistance, small in birefringence, and high cracking resistance. As to the thermosetting conditions, heating at 150 to 250° C. for one to several hours is preferable.

When the optical waveguide type wavelength filter is fabricated using the thermosetting silicone which is high in heat resistance and superior in cracking resistance, the production process can be carried out as follows. First, refractive index adjustment of silicone oligomer is made, and at least two types of silicone oligomers having an exactly controlled refractive index difference are prepared as core and cladding materials. Magnitude of refractive index difference is determined according to the core size, typically when the cross-section of core part is 8 µm square, the refractive index difference is about 0.3 to 1%. In the case of thermosetting silicone used in the present invention, refractive index of finally obtained optical waveguide thin film can be adjusted by the composition of the raw materials, that is, mixing ratio of deuterated phenyl trichlorosilane and methyl trichlorosilane.

Next, the cladding material with an adjusted refractive index is coated on a substrate such as silicon and cured to form a lower cladding.

Further, on the lower cladding a core material is coated and cured. Here, since the cladding material and core material are coated in the state of oligomer, orientation of molecular chain during film formation is suppressed resulting in decreased birefringence.

Next, a layer to be an etching mask is formed on the core, and processed into a waveguide pattern forming the wavelength filter by photolithography or the like. As the optical waveguide pattern, in addition to the arrayed waveguide grating shown in FIG. 1, an asymmetric Mach-Zehnder interferometer or the like can be used. As the etching mask, an organic photoresist or a metal is used. Still further, the core is processed into a desired optical waveguide pattern by reactive ion etching, and on top of which an upper cladding is coated and cured. The thus fabricated optical waveguide type wavelength filter using thermosetting silicone is superior in heat resistance, transparent in both communication wavelength bands of 1.3 µm and 1.55 µm, is small in polarization dependence, and has a wide tunable wavelength range.

A temperature controller further provided in the wavelength filter according to the present invention can be a heater having a feedback circuit, a Peltier thermo-controller, or the like. To suppress fluctuation in peak transmission wavelength due to temperature change, the temperature controller is preferably of a type which can control temperature within ±1° C.

Embodiment 4

Deuterated phenyl trichlorosilane and methyl triethoxysilane (60:40 in molar ratio) were dissolved in dehydrated toluene, and slowly added dropwise into a water-tetrahydrofuran (THF)-toluene mixture agitated in an ice bath. After reacting for 5 hours, organic layer was separated and washed with water while neutralizing, after being allowed to stand, an insoluble matter separated from the organic layer was filtered and dried. The organic solvent was completely distilled out under vacuum, the resulting white solid was dissolved in ethanol, a small amount of hydrochloric acid was added, and heat refluxed. After reaction, ethanol was distilled out under vacuum, thoroughly washed with toluene-water system while neutralizing. The resulting product had a weight-averaged molecular weight of 5000.

When the above silicone oligomer is used as the core material, the cladding material was synthesized as follows.

A white solid was obtained from deuterated phenyl trichlorosilane and methyl triethoxysilane (52:48 in molar ratio) using the same procedure as in the above core material synthesis. The weight-averaged molecular weight was about 5000. The core material and the cladding material were respectively dissolved in methyl isobutyl ketone (MIBK), and spin coated. The spin coated films were heat cured at 200° C. for 2 hours, and measured for refractive index in optical communication wavelength regions. Measurement results of refractive index are shown in Table 2.

TABLE 2

|  | Wavelength 1.3 µm (TE/TM) | Wavelength 1.55 µm (TE/TM) |
| --- | --- | --- |
| Thermosetting silicone (core) | 1.5040/1.5039 | 1.5020/1.5019 |
| Thermosetting silicone (clad) | 1.4927/1.4928 | 1.4907/1.4908 |
| Relative refractive index difference (%) | 0.75 | 0.75 |

An arrayed waveguide grating type wavelength filter was fabricated using the above two types of silicone oligomers for the core and cladding. First, cladding silicone oligomer was coated on a silicon substrate by a spin coating method to form a film. At this moment, rotation speed of spin coater was adjusted so that the film thickness was 20 µm. The resulting thin film was cured by heating at 200° C. for 2 hours to obtain a lower cladding layer. Then, on top of the lower cladding layer, core silicone oligomer was coated in a condition to obtain a film thickness of 8 µm, which was cured at 200° C. for 2 hours. Next, a copper thin film was stacked by sputtering and an arrayed waveguide grating mask pattern was formed by photolithography and ion milling. Further, the core layer of the part other than the mask pattern was removed by reactive ion etching to form a core ridge. After the etching mask was removed, cladding silicone oligomer was coated on top, cured as in the formation of the lower cladding to form an embedded type optical waveguide comprising a core/cladding structure. Thickness of the upper cladding was 10 µm from the upper surface of the core.

Specifications of the resulting arrayed waveguide grating type wavelength filter are shown in Table 3. The wavelength filter was cut to a size of 30 mm×40 mm and mounted on a Peltier thermo-controller.

TABLE 3

| Pitch of input/output waveguide | 25 µm |
| --- | --- |
| Focal length of slab waveguide | 9533 µm |
| Pitch of arrayed waveguide | 25 µm |
| Optical length difference of arrayed waveguides | 126.4 µm |
| Number of arrayed waveguides | 101 |

In a condition where temperature of the optical waveguide is maintained at 25° C. by driving the Peltier thermo-controller, the wavelength filter was measured for transmission characteristics. In 1.55 µm wavelength band, the wavelength filter had a free spectral range (FSR) of 12.8 nm, a channel spacing between adjacent ports of 0.81 nm, and a FWHM of 0.2 nm. Further, the insertion loss was −7 dB, and cross-talk between adjacent channels was −30 dB. When light is incident from the central port of the input waveguide, the peak transmission wavelength of output light from the central port of the output waveguide was 1554.5 nm at a diffraction order of 122.

Still further, when the controlled temperature of the optical waveguide was changed to 10° C. and 80° C., the peak transmission wavelength was changed to 1557.4 nm and 1544.6 nm, respectively. That is, a shift of peak wavelength comparable to FSR was obtained by a temperature change of 70° C. Yet further, these characteristics were unchanged even after heating the optical waveguide at 120° C. for 100 hours.

Embodiment 5

Figure 8:
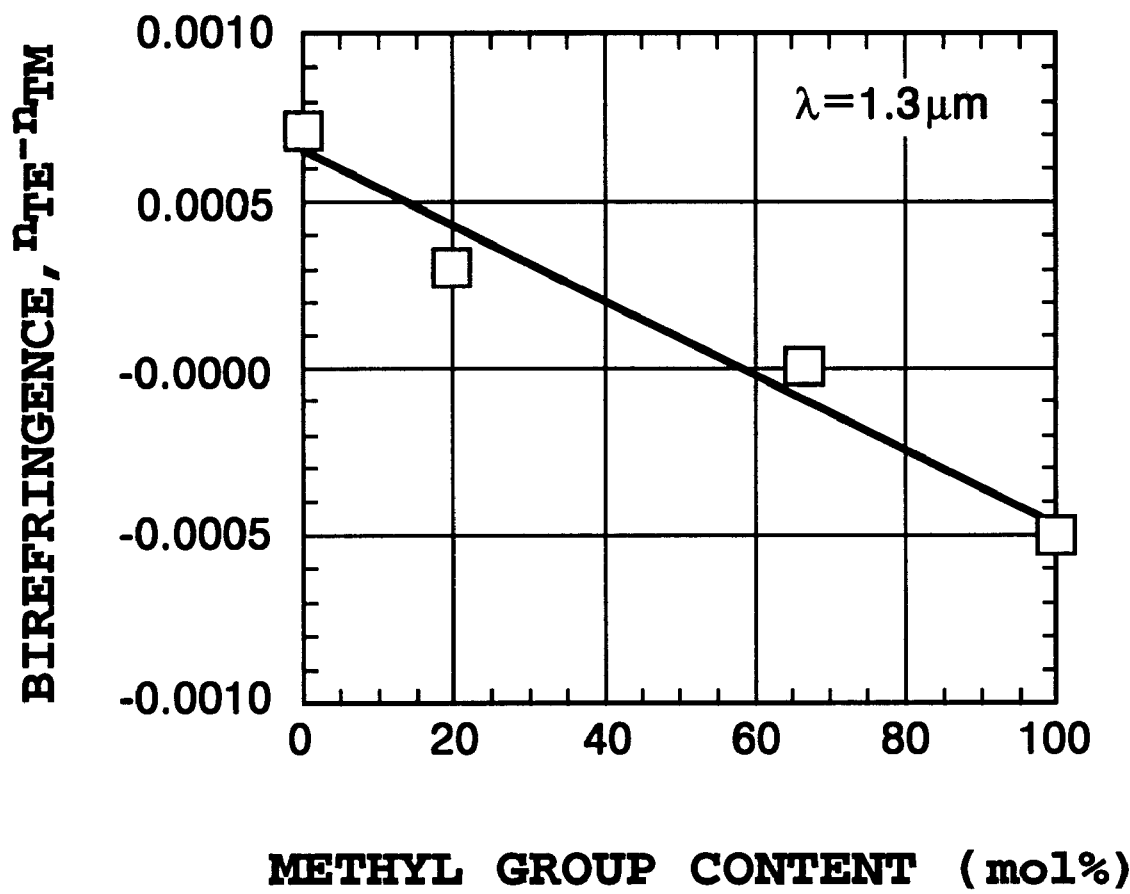
FIG. 8 is a graph showing composition dependence of birefringence of material used in a wavelength filter according to a fifth embodiment of the present invention.

Using the same method as in Embodiment 4, materials differing in molar ratio (hereinafter referred to as "raw material ratio") of deuterated phenyl trichlorosilane and methyl trichlorosilane as raw materials were synthesized, and a thin film was prepared on a silicon substrate. Refractive index of the thin film was evaluated using a prism coupler type refractometer to examine magnitude of birefringence ($n_{TE}-n_{TM}$) at 1.3 μm. FIG. 8 shows the result in mole fraction of methyl triethoxysilane as a material on the axis of abscissas. From the result, it has been found that the material used in the present invention changes in birefringence from a positive value to a negative value depending on the raw material ratio, and birefringence is zero at a specific raw material ratio.

Further, in order to confirm elimination of polarization dependence of peak transmission wavelength in the waveguide type wavelength filter of the present invention, using the same method as in Embodiment 4, core materials and cladding materials having raw material ratios shown in Table 4 were synthesized, and a straight optical waveguide was fabricated. The fabricated waveguide was measured for birefringence ($n_{TE}-n_{TM}$) of effective refractive index at wavelength 1.5 μm using a Senarmont interferometer. The measurement results are shown in Table 4. It has been found from the results that the optical waveguide used in the present invention changes in polarization dependence of effective refractive index from a positive value to a negative value depending on the changing ratio of materials, and absolute value of polarization dependence of effective refractive index is zero at a specific raw material ratio. Using a material of this composition, it was able to fabricate a wavelength filter having no polarization dependence of peak wavelength.

TABLE 4

|  | Charging ratio (core) | Charging ratio (clad) | Weight-averaged molecular weight | Curing temperature-time | $n_{TE} - n_{TM}$ at 1.55 μm |
|---|---|---|---|---|---|
| Waveguide 1 | 80:20 | 74:26 | 2500 | 300° C., 1 hr | 0.0012 |
| Waveguide 2 | 33:67 | 27:73 | 3000 | 180° C., 1 hr | 0.0001 |
| Waveguide 3 | 6:94 | 0:100 | 6000 | 150° C., 1 hr | -0.0010 |

(Polymeric optical waveguide type tunable wavelength filter)

The polymeric optical waveguide type tunable wavelength filter according to the present invention comprises an input/output optical circuit, an optical waveguide constituting the optical circuit, a grating structure part formed in the course of the optical waveguide, and a temperature controller for controlling temperature of the grating structure part.

The inventors have fabricated a tunable wavelength filter of the above construction using a thermosetting silicone oligomer same as that used in the above-described wavelength filter at least in the grating structure part of the optical circuit of the tunable wavelength filter of the above construction, and found that the resulting tunable wavelength filter is high in heat resistance, low in propagation loss at communication wavelength bands of 1.31 μm and 1.55 μm, capable of tuning the peak wavelength over a wide range by using a thin film heater as a temperature controller, and possible to make high-speed channel selection.

The polymeric optical waveguide type tunable wavelength filter according to the present invention will be described in detail below.

Either of relief type or refractive index modulation type can be used as the grating structure part.

Figure 9A:
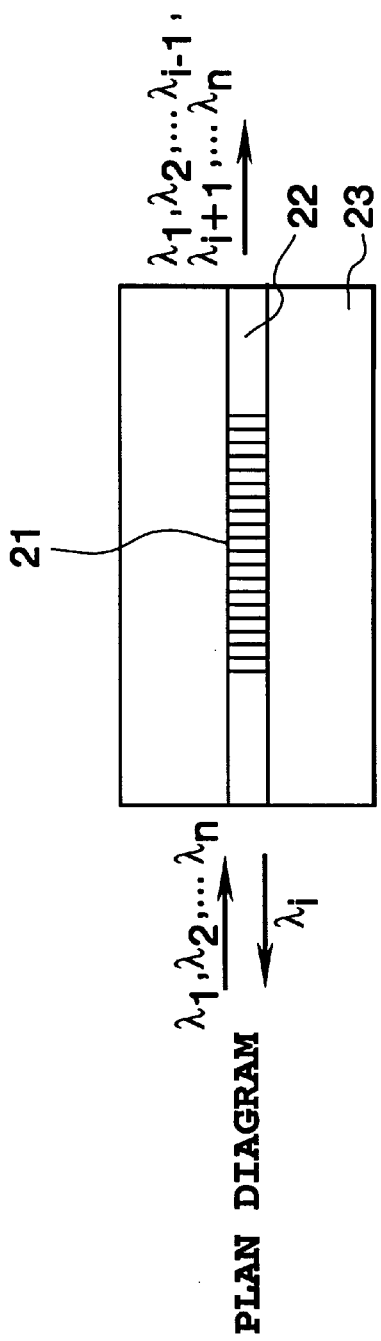
FIG. 9A is a schematic plan diagram showing the tunable wavelength filter according to the present invention having a relief type grating structure.
Figure 9B:
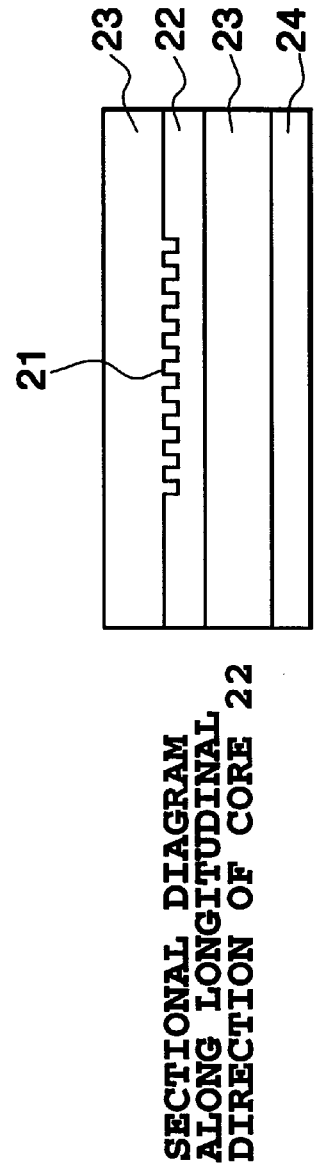
FIG. 9B is a schematic sectional diagram taken along a longitudinal direction of core of the tunable wavelength filter shown in FIG. 9A.

A schematic perspective diagram of the relief type optical waveguide grating structure and a sectional diagram taken along longitudinal direction of the core are shown in FIG. 9A and 9B, respectively. In the figures, reference numeral 21 indicates a relief type grating, 22 is a core, 23 is a cladding, and 24 is a substrate. Fabrication process is the same as the process for fabricating ordinary embedded type channel waveguide by way of thin stacking by spin coating, and core-ridge fabrication by photolithography and etching. The relief type grating 21 can be fabricated by processes after stacking the core 22, or after forming the core-ridge, which are coating a resist, depicting grating pattern by 2-beam interference exposure or phase mask exposure or electron beam depiction, followed by development and etching.

A schematic plan diagram of the refractive index modulation type optical waveguide grating structure and a sectional diagram taken along longitudinal direction of the core are shown in FIGS. 10A and 10B, respectively. In the figures, reference numeral 31 indicates a refractive index modulation type grating, 32 is a core, 33 is a cladding, 34 is a substrate, and 35 is a part provided with a refractive index change in the core. The core 22 can be formed by using the above-described thermosetting silicone resin, and depicting grating pattern as a refractive index change by 2-beam interference exposure of UV light or phase mask exposure of UV light.

The optical waveguide grating 31, which reflects light of a predetermined wavelength, requires an optical circuit for separating reflected light to achieve ADM function.

Figure 11:
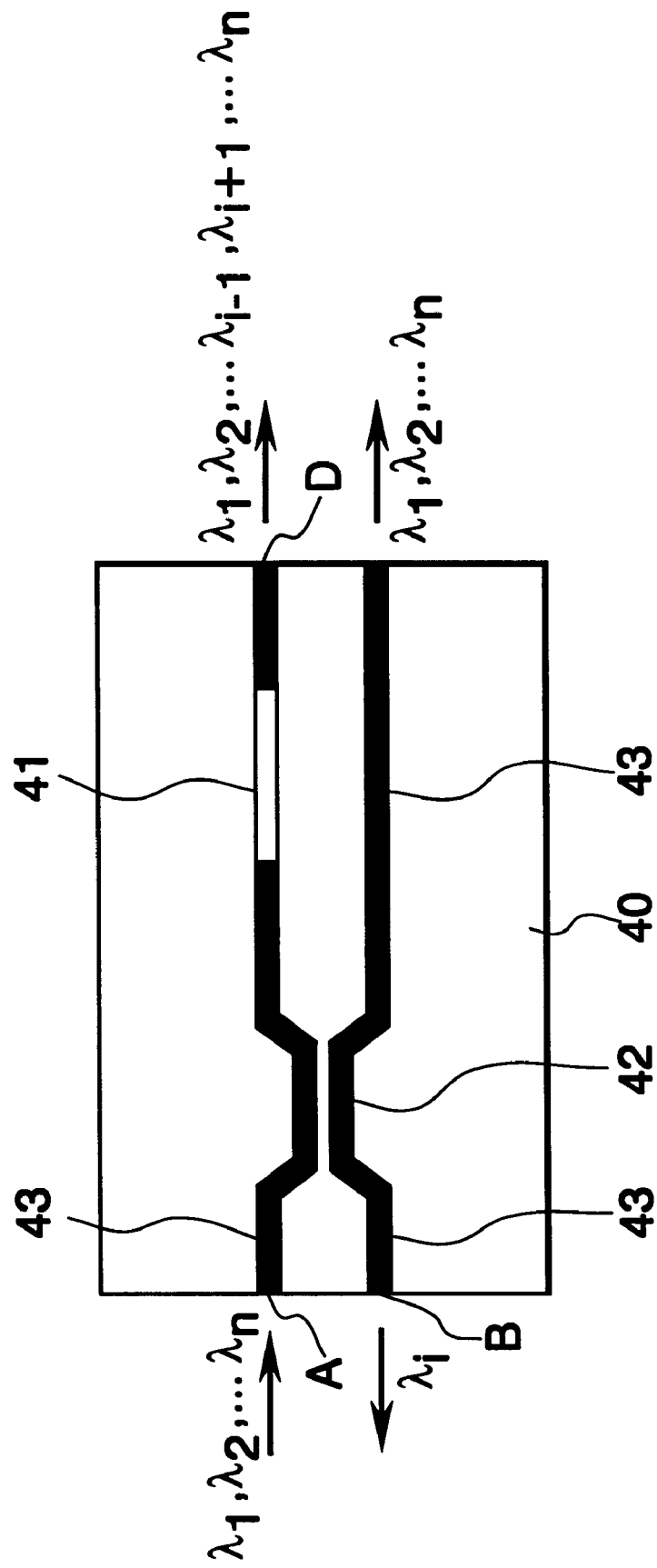
FIG. 11 is a schematic plan diagram showing the structure of the tunable wavelength filter according to the present invention having an optical waveguide grating and a directional coupler.

FIG. 11 shows ADM by a directional coupler of the polymeric optical waveguide fabricated simultaneously with the grating. In the figure, reference numeral 40 indicates a tunable wavelength filter, 41 is a grating structure part (wavelength filter), 41 is a directional coupler, and 43 is an input/output optical circuit. In a device of this structure, the optical circuit 43 is composed only of optical waveguide. Further, A is an input port of the optical circuit (optical waveguide) 43, B is a drop port, and D is an output port. These port symbols indicate similar ports in the drawings hereinafter. In the drawings hereinafter, C indicates an add port.

Figures 12A, 12B:
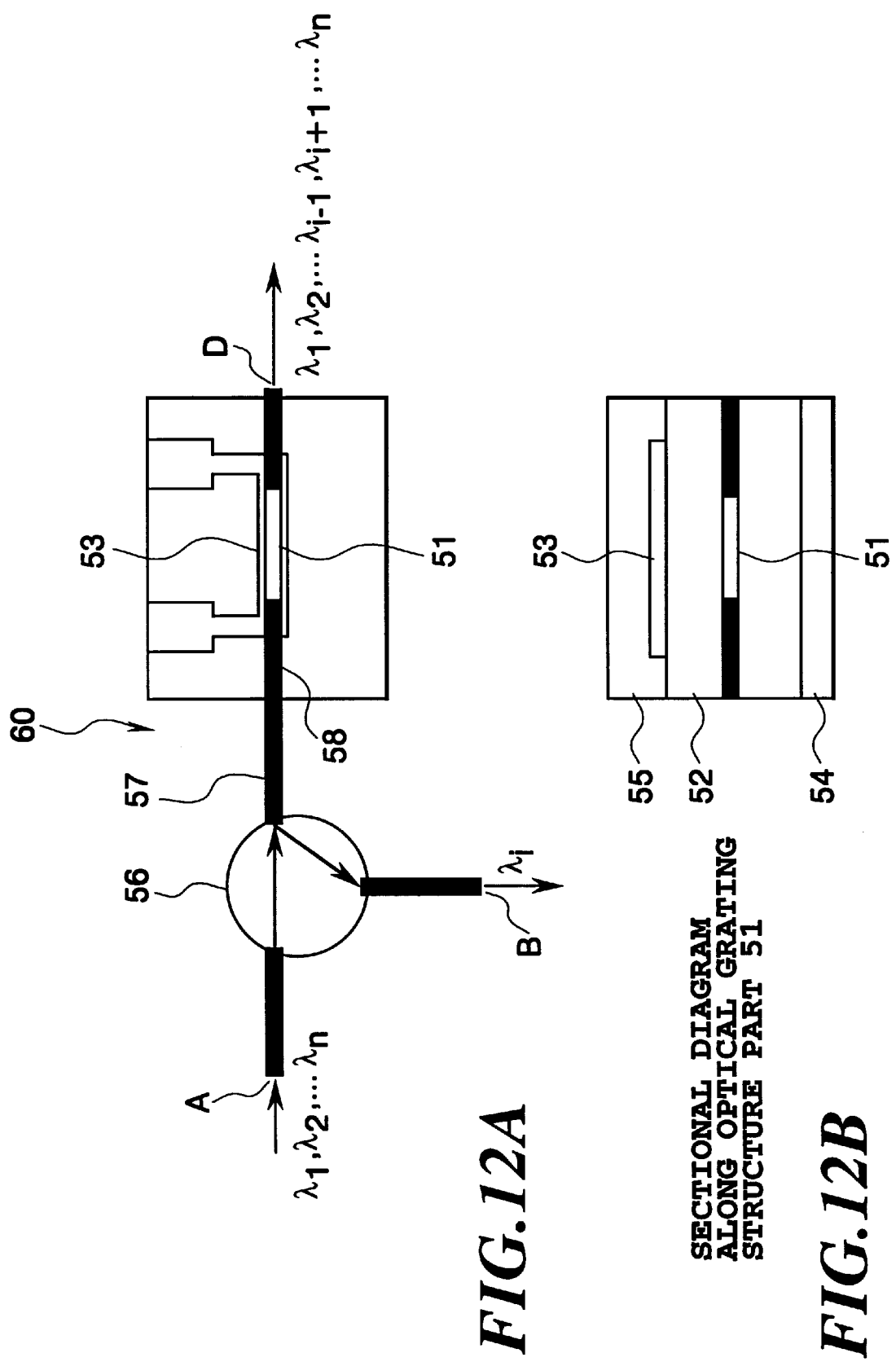
FIG. 12A is a schematic plan diagram showing the tunable wavelength filter according to the present invention having an optical waveguide grating and an optical circulator.
FIG. 12B is a schematic sectional diagram taken along the optical grating structure of the tunable wavelength filter shown in FIG. 12A.

On the other hand, FIGS. 12A and 12B show ADM using an optical circulator connected to outside of the polymeric waveguide grating. In the figures, reference numeral 51 indicates a grating structure part (wavelength filter), 52 is a cladding, 53 is a thin film heater, 54 is a substrate, 55 is a heat insulation layer, and 56 is an optical circulator. In this ADM, the optical circuit 60 comprises an optical circulator 56, an optical fiber 57, and an optical waveguide 58. The grating structure part 51 is formed in the course of the optical waveguide 58, and temperature control of the grating structure part 51 is made by the thin film 53.

Figure 13:
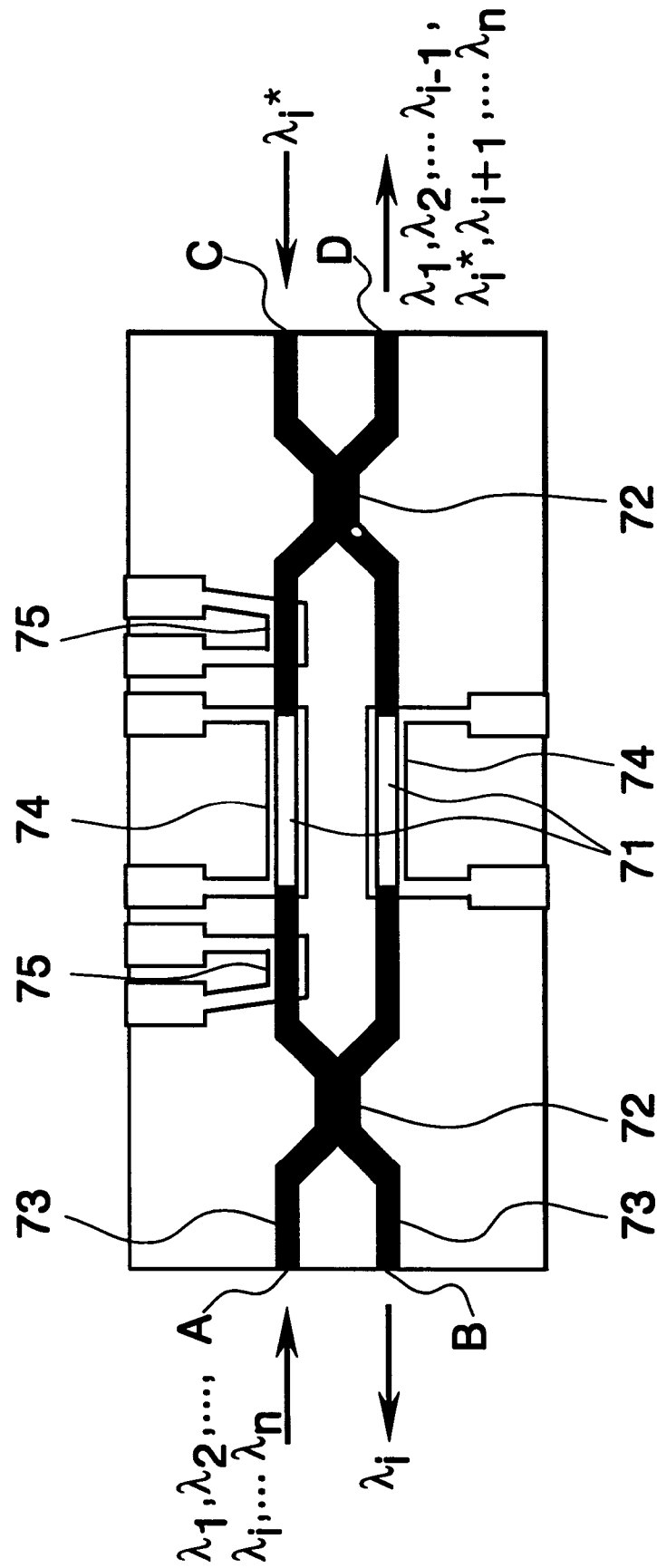
FIG. 13 is a schematic plan diagram of the tunable wavelength filter according to the present invention having an optical waveguide grating and a Mach-Zehnder interferometer.

Further, FIG. 13 shows the structure of ADM for simultaneously making mixing and split of a selected channel (wavelength λi). In the figure, reference numeral 71 indicates a grating structure part (wavelength filter), 72 is a directional coupler, 73 is an input/output optical circuit (optical waveguide), 74 is a thin film heater for tuning wavelength, and 75 is a trimming thin film heater. In ADM of the structure of FIG. 13, the input/output optical circuit 73 is composed only of optical waveguide, which forms a Mach-Zehnder interferometer. The grating wavelength filter 71 is formed in two arms of the Mach-Zehnder interferometer (MZI) to make a symmetrical structure as a whole. In the case of channel split, only wavelength λi of WDM signal light is reflected by the two grating structure parts 71, and outputted to the drop port B through the directional coupler 72. In the same principle, channel mixing can also be made simultaneously by inputting optical signal of wavelength λi to the add port C. Here, since optical path lengths of the two arms and position of the grating structure part 71 are required to be exactly symmetrical to the MZI, a trimming thin film heater 75 is provided to correct symmetry of optical path length by TO effect.

Embodiment 6

A tunable wavelength filter of ADM structure shown in FIG. 12 was fabricated. Refractive index difference was adjusted to 0.3%. An embedded type polymeric optical waveguide was formed on a metal substrate 54 using the above-described thermosetting silicone polymer as cladding 52 material and core material. Cross sectional size of the core was 8 μm×8 μm, and the waveguide was straight. This optical waveguide was irradiated with UV light through a phase mask to depict the refractive index modulation type grating waveguide 51 having a refractive index difference of $5\times10^{-4}$ and a period of 0.51 μm. A metal thin film was stacked, and the thin film heater 53 was formed on the grating structure part 51 using photolithography and dry etching. Here, the heater 53 was 30 μm in width and 3 mm in length. Further, the same material as the cladding 52 was stacked to form the heat insulation layer 55. The wavelength filter optical circuit board was mounted on an aluminum block electronically temperature controlled using a thermocouple and a piezo-electric device. The tunable wavelength filter was connected to the optical circulator 56 through the optical fiber 57.

Figure 14:
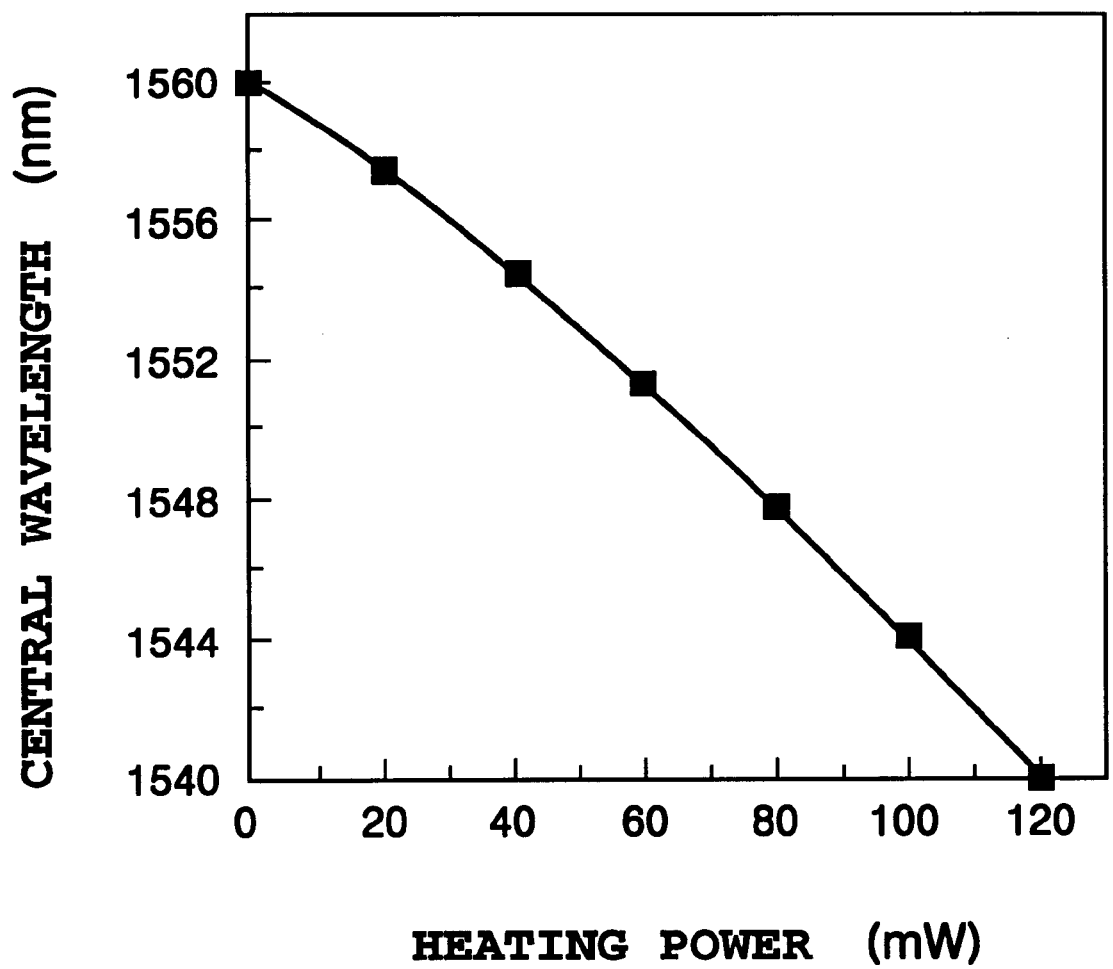
FIG. 14 is a graph showing the relationship between heating power of thin film heater and peak transmission wavelength of the tunable wavelength filter according to the present invention.

Output of a 1.55 μm band tunable wavelength laser diode light source was inputted into the input port A shown in FIG. 12 through an optical fiber to measure wavelength dependence of drop port B output. When the substrate was controlled at a temperature of 25° C. and the thin film heater 43 was not heated, transmission characteristics to the port B are a peak wavelength of 1560 nm, a bandwidth of 0.4 nm, an insertion loss of 4 dB, and an extinction ratio of 20 dB. When the thin film heater 53 was heated, peak transmission wavelength was shifted to a shorter wavelength. The relationship between the heating power and the peak wavelength at this time is shown in graph of FIG. 14. Response time was 10 ms measured from the heating power changed stepwise until light of a specific wavelength transmitted and the light output stabilized. Thus, it has been confirmed that the present device operates as a tunable wavelength filter, tunable wavelength range is sufficiently large as ADM, and the response speed is sufficiently high.

Embodiment 7

A tunable wavelength filter of ADM structure shown in FIG. 13 was fabricated.

After the lower cladding layer and core layer were stacked on a metal substrate using the same material as in Embodiment 6, a resist was coated, and grating pattern of a period of 0.51 μm and a length of 1 mm was depicted in two positions using an electron beam depicting apparatus. After developing the resist, relief type grating structure parts 71 of 0.8 μm in depth were formed in the core layer by dry etching. After removing the resist, an embedded type optical waveguide having a MZI core pattern was formed using the same method as in Embodiment 6. Positions of the two grating structure parts 71 were at the center of two arms of MZI. A metal thin film was stacked, a thin film heat 74 of pattern shown in FIG. 13 was formed using photolithography and dry etching. Here, the wavelength selection thin film heater 74 had a width of 30 μm and a length of 2 mm. The same material as the cladding was further stacked to form a heat insulation layer. The wavelength filter optical circuit board was mounted on an aluminum block electronically controlled in temperature using a thermocouple and a piezo-electric device.

Figure 15:
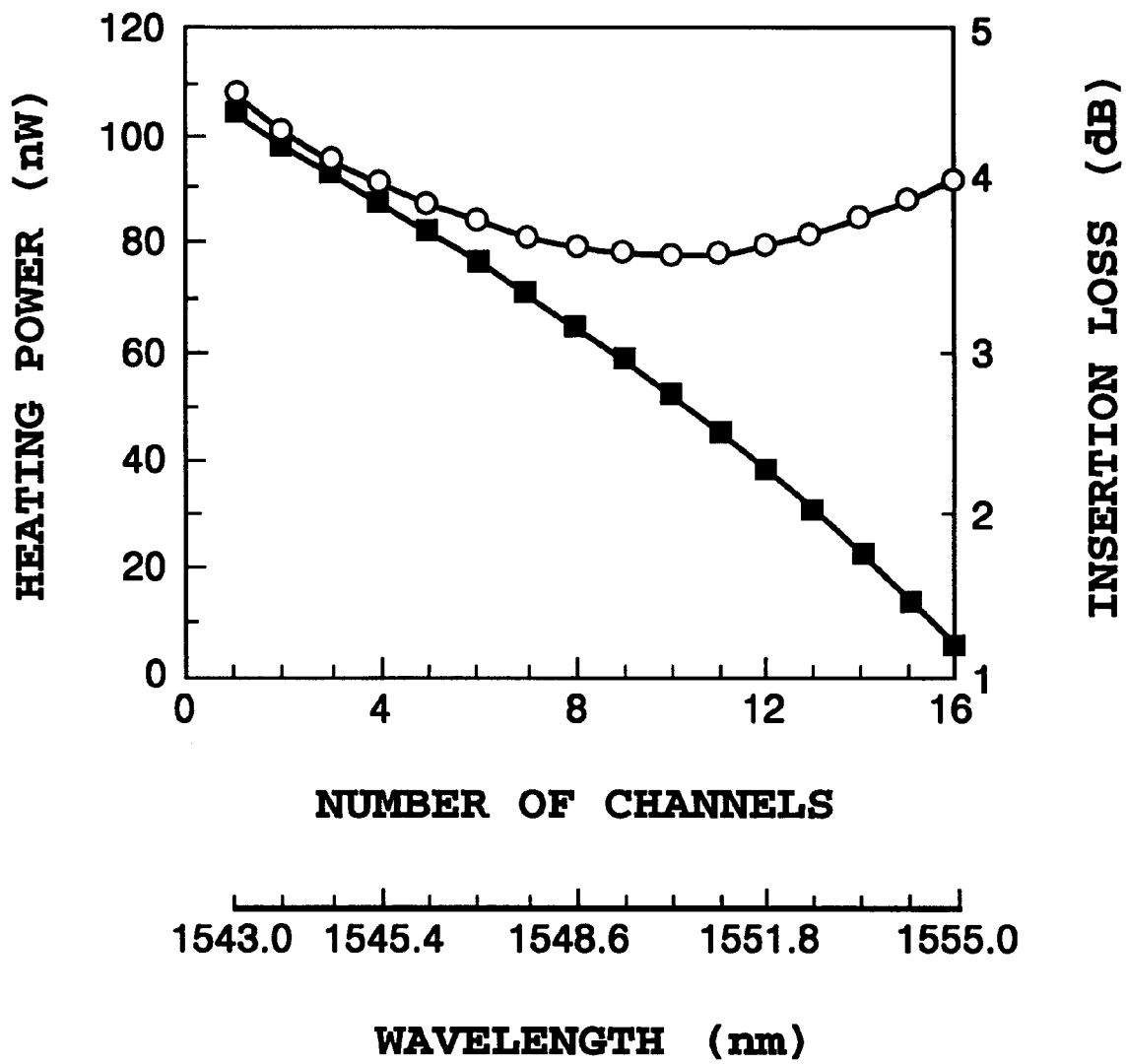
FIG. 15 is a graph showing the relationship among channel number, heating power of thin film heater, and insertion loss when each channel is demultiplexed by tunable wavelength filter according to the present invention, which graph simultaneously showing wavelength of each channel.

16-Channel optical signals multiplexed in wavelength division at 0.8 nm spacing from 1543 nm to 1555 nm are applied to the input port A shown in FIG. 13. Heating power of the thin film heater 74, insertion loss, and cross-talk from unselected channels were measured when each channel signal was outputted to the drop port B. At this moment, the substrate was controlled at a temperature of 25° C., and the trimming thin film heater 75 was controlled so that output of the selected channel was maximum. FIG. 15 shows heating power of the thin film heater 74 and insertion loss. The cross-talk was less than −20 dB in either case. Further, it was confirmed that when a signal of selected wavelength was inputted in the add port C, the same insertion loss as in the above drop characteristic was outputted to the output port D.

From the above description, the tunable wavelength filter of the present invention was confirmed to have practical characteristics as a 16CH ADM.

As described above, the tunable wavelength filter according to the present invention is simple and compact in construction, low in consumption power, and operates as a high-speed response ADM. By using this ADM, a WDM system can be constructed compact in size and at a reduced cost.

Although in the above respective embodiments, the entire optical waveguide constituting the filter is formed of thermosetting silicone polymer specific to the present invention, to attain the object of the present invention, at least only the functional part, that is, the grating structure part, may be formed of the thermosetting silicone polymer.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A digital thermo-optic switch comprising a polymeric optical splitter and a heating element:

wherein said polymeric optical splitter is formed of a polymer obtained by thermosetting a copolymer including the following components

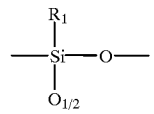

-continued

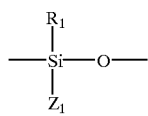

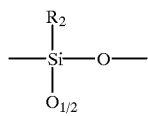

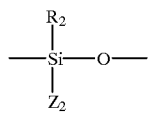

wherein $R_1$ is a deuterated phenyl group or a halogenated phenyl group represented by $C_6X_5$ (X denotes deuterium or halogen), $Z_1$ is a hydroxy group or an alkoxy group represented by $OC_mH_{2m+1}$ (m is an integer of 3 or less), $R_2$ is an alkyl group, a deuterated alkyl group or a halogenated alkyl group represented by $C_nY_{2n+1}$ (Y denotes hydrogen, deuterium or halogen, and n is a positive integer), and $Z_2$ is a hydroxy group or an alkoxy group represented by $OC_mH_{2m+1}$ (m is an integer of 3 or less); and wherein at least $Z_1$, or $Z_2$ is the alkoxy group; and having a weight-averaged molecular weight of 10000 or less.

2. A polymeric waveguide wavelength filter including a polymeric optical waveguide having a waveguide filter function;

wherein said polymeric optical waveguide is formed of a polymer obtained by thermosetting a copolymer including the following components

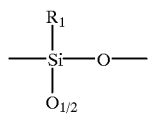

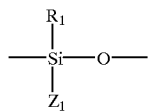

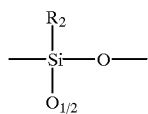

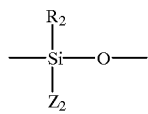

wherein $R_1$ is a deuterated phenyl group or a halogenated phenyl group represented by $C_6X_5$ (X denotes deuterium or halogen), $Z_1$ is a hydroxy group or an alkoxy group represented by $OC_mH_{2m+1}$ (m is an integer of 3 or less), $R_2$ is an alkyl group, a deuterated alkyl group or a halogenated alkyl group represented by $C_nY_{2n+1}$ (Y denotes hydrogen, deuterium or halogen, and n is a positive integer), and $Z_2$ is hydroxy group or an alkoxy group represented by $OC_mH_{2m+1}$ (m is an integer of 3 or less); and wherein at least $Z_1$ or $Z_2$ is the alkoxy group; and having a weight-averaged molecular weight of 10000 or less.

3. The polymeric waveguide wavelength filter as claimed in claim 2, further comprising a temperature controller enabling optionally separating or mixing optical signal of a specific wavelength by controlling temperature of polymeric waveguide.

4. A polymeric optical waveguide tunable wavelength filter comprising an optical circuit for making input/output and mixing and splitting of lightwaves, a grating structure part formed in the course of optical waveguide constituting said optical circuit, and a temperature controller enabling optionally separating or mixing optical signal of a specific wavelength transmitting in said optical circuit by controlling temperature of said grating structure part:

wherein at least said grating structure part of said optical waveguide is formed of a polymer obtained by thermosetting a copolymer including the following components

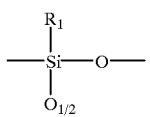

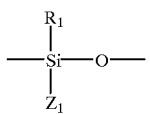

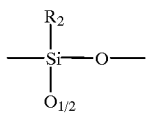

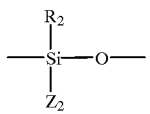

wherein $R_1$ is a deuterated phenyl group or a halogenated phenyl group represented by $C_6X_5$ (X denotes deuterium or halogen), $Z_1$ is a hydroxy group or an alkoxy group represented by $OC_mH_{2m+1}$ (m is an integer of 3 or less), $R_2$ is an alkyl group, a deuterated alkyl group or a halogenated alkyl group represented by $C_nY_{2n+1}$ (Y denotes hydrogen, deuterium or halogen, and n is a positive integer), and $Z_2$ is a hydroxy group or an alkoxy group represented by $OC_mH_{2m+1}$ (m is an integer of 3 or less); and wherein at least $Z_1$ or $Z_2$ is the alkoxy group; and having a weight-averaged molecular weight of 10000 or less.

5. The polymeric optical waveguide tunable wavelength filter as claimed in claim 4, wherein said temperature controller is a local heater provided in the vicinity of said grating structure part for heating only the vicinity of said grating structure part.

* * * * *

UNITED STATES PATENT AND TRADEMARK OFFICE
CERTIFICATE OF CORRECTION

PATENT NO. : 6,084,050
DATED : July 4, 2000
INVENTOR(S) : Ooba et al

It is certified that error appears in the above-identified patent and that said Letters Patent are hereby corrected as shown below:

Col. 2, ln. 9: before "Polymeric" change "devices)." to --devices.-- (Ours)

Co. 7, ln. 13: after "in formulae" delete --formulae-- (Ours)

Col. 19, ln. 63: after "represented by" change "$C_{6X5}$" to --$C_6X_5$-- (PTO)

Signed and Sealed this

Twenty-second Day of May, 2001

*Attest:*

NICHOLAS P. GODICI

*Attesting Officer*   *Acting Director of the United States Patent and Trademark Office*